May 26, 1970   A. CARABASSE   3,513,582
FISHING ROD
Filed Aug. 29, 1968   2 Sheets-Sheet 1
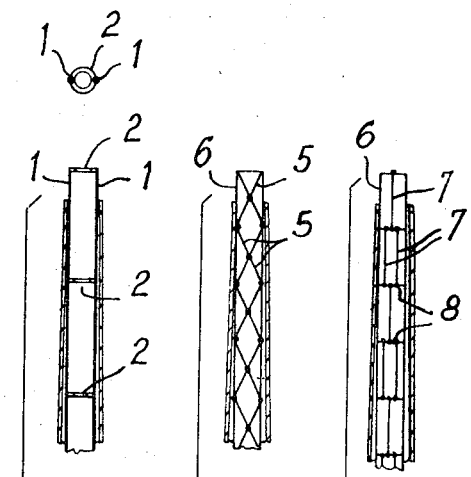
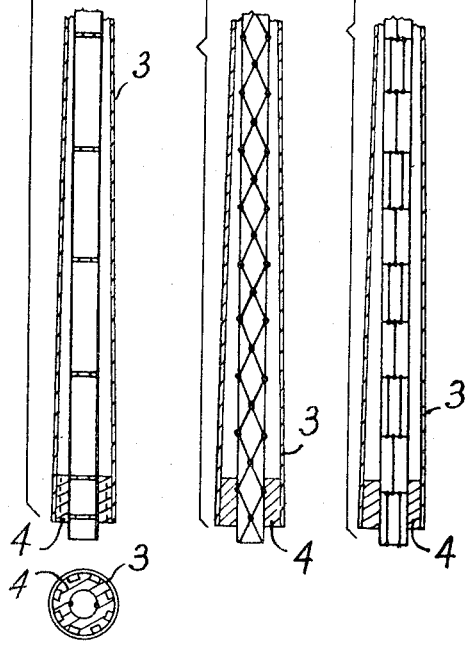
Fig. 1A
Fig. 1
Fig. 1B   Fig. 2   Fig. 3
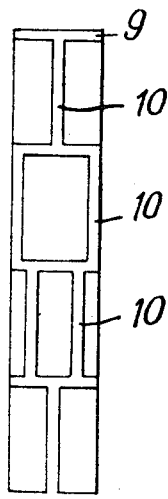
Fig. 4
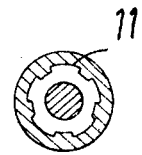
Fig. 5
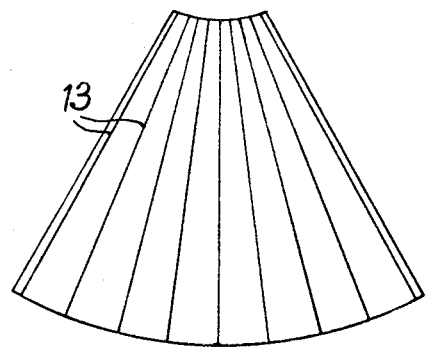
Fig. 6
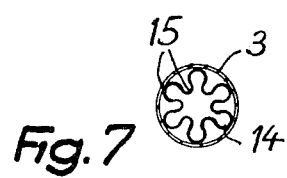
Fig. 7
INVENTOR
ANDRÉ CARABASSE
By Bacon & Thomas
ATTORNEYS May 26, 1970  A. CARABASSE  3,513,582
FISHING ROD Filed Aug. 29, 1968  2 Sheets-Sheet 2

INVENTOR
ANDRÉ CARABASSE
By Bacon & Thomas
ATTORNEYS

United States Patent Office 3,513,582
Patented May 26, 1970

3,513,582
FISHING ROD
Andre Carabasse, 22 Rue Rouget de l'Isle,
Saint-Prix, France
Filed Aug. 29, 1968, Ser. No. 756,213
Claims priority, application France, Sept. 1, 1967,
119,763
Int. Cl. A01k 87/00, 87/04
U.S. Cl. 43—18                                                 11 Claims

ABSTRACT OF THE DISCLOSURE

A fishing rod or fishing rod section which is hollow and which has internally an element of lattice form and of a water-repellent material for guiding a fishing line through the interior of the rod or rod section. The element has annular ribs and grooves extending longitudinally of the rod or rod section and is of hollow cylindrical shape.

This invention relates to a fishing rod.

According to the invention, there is provided a fishing rod or fishing rod section which is hollow and which has internally an element of lattice form and of a water-repellent material for guiding a fishing line through the interior of the rod or rod section.

By "lattice form," we mean a structure consisting essentially of a framework defining a series of holes in regular or irregular pattern or a structure having formed in a major surface thereof a series of grooves and/or ribs positioned in regular or irregular pattern.

By "water-repellent," we mean any material which is not normally wetted by water and over which water will flow without leaving a film. Such material is alternatively referred to as being hydrophilic.

Figure 8:
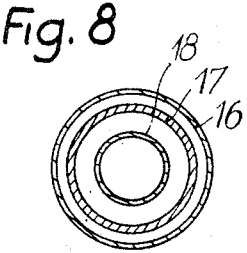
Figures 9, 10:
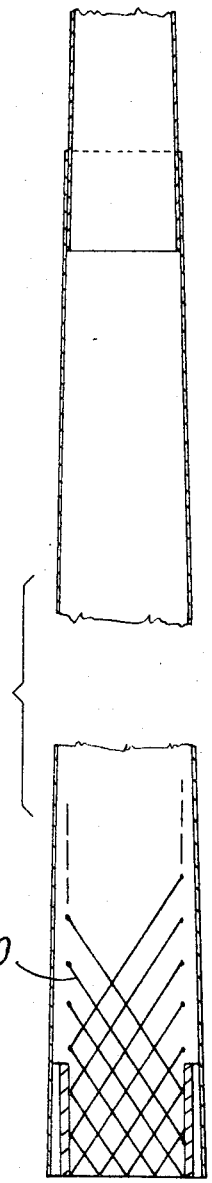
Figure 11:
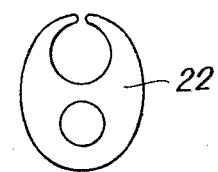
Figure 12:
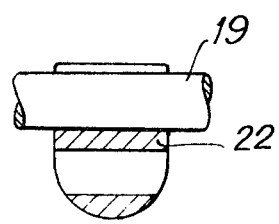

Features and advantages of the invention will be apparent from the following description of embodiments thereof given by way of example only in conjunction with the accompanying drawings in which:

FIGS. 1, 2 and 3 diagrammatically illustrate in longitudinal section, different embodiments of the fishing rod according to the invention, FIG. 1A is a top view and FIG. 1B is a bottom view of FIG. 1, FIG. 4 is an enlarged view of an embodiment of an internal, water-repellent, element for each rod section, FIG. 5 shows in cross section, the outer nozzle of an extruder head for extruding an element, FIGS. 6 and 7 show a further form of an internal element, FIGS. 8 and 9 show a telescopic rod, FIG. 10 shows a rod with a solid tip section, and FIGS. 11 and 12 show a line holder for the tip section.

Referring to FIG. 1, there is shown a fishing rod or fishing rod section 3 which is hollow and which has an internal element 1, 2 of lattice form and of a water-repellent material for guiding a fishing line through the interior of the rod or section. The element which is detachable from the rod or rod section 3 is formed from glass threads 1 coated with polyesters and small rings 2 of polyester glass of constant diameters, the glass threads being first of all immersed in a bath of suitably catalysed and accelerated unsaturated polyester, and then reduced to a diameter of 0.2 to 0.5 mm. by drawing in a die. The thread thus obtained is cut to the desired length which is slightly longer than the length of the rod or rod section, and after having been taken to the state of incipient solidification, at least two of these threads are joined to the glass rings 2. The rings thus welded to the threads are less than 50 mm. away from one another, and preferably 10 to 30 mm., their mutually parallel planes being perpendicular to the direction of the glass threads. This results in a sort of cage, generally cylindrical, which is inserted ito the corresponding length of rod or rod section. In the case in which the rod is made up of a plurality of sections fitting into one another, the minimum internal diameter of the element 1, 2 is so calculated that the rod section provided with this element can receive and guide the incoming rod section with a sliding action; the element is fixed to the rod section by any suitable means, preferably by means of at least one end ring of polyethylene, polyvinylchloride or rubber inserted into at least one end of the rod section. According to a preferred form of the invention, a single end fixing ring 4 is used for each rod section and is introduced into the larger end of each rod section; the ring 4 is castellated on its periphery or provided with suitable equivalent apertures in order to allow the water which accumulates in the rod section to flow therefrom; the element 1, 2 at the other end of each rod section extends slightly beyond the end of the rod section and is held in place simply by friction by the neighbouring section or by a suitable cement.

The element 1, 2 may be formed of polypropylene, the rings 2 being prepared by moulding or stamping from a sheet 2 mm. thick.

Referring to FIG. 2, there is shown a telescopic glass-fibre rod or rod section having a detachable internal element 6 in the form of a light semi-rigid cylindrical lattice which is deformable in diameter and water-repellent and which is made up of polyester glass threads 5 forming between them diamond-shaped spaces whereof the apices are the nodes of the network, these nodes being aligned in a direction along the length of the rod or rod section. Such a lattice is capable of limited longitudinal extension under traction, adapts itself to a certain range of diameters, and is not damaged when it is slightly expanded by the connection of two rod sections. Such a lattice can be used where the rod or rod section has a conical interior.

The threads 5 are not of circular cross section but approximately semi-circular, the curved surface of some threads facing inwardly and that of other threads facing outwardly. This arrangement is particularly favourable to internal guiding of the fishing line, which slides obliquely in the lattice on the rounded threads, and therefore jumps every other thread. The size of the mesh must clearly be made appropriate to the cross-section of the lattice and to the dimensions of the threads of which it is made. The element, which is hot-edged at each end, is slid into each rod section from the larger end of the latter until it extends a few centimetres beyond the small end of the rod section. It is centred in the larger end of the rod section as in FIG. 1 by a castellated ring 4 moulded in low-density polethylene which may for example be expanded to 0.7 in the course of moulding, this ring 4 acquiring a gripping action on the element when it is placed in position in the larger end of the rod section.

If the element is not to be detachable, the end which extends beyond the smaller end of the rod section is slightly stretched, and the network is preferably folded back externally on to the rod section, where it is fixed, for example by a tape of glass cloth impregnated with catalysed and accelerated unsaturated polyester.

Referring to FIG. 3, the fishing rod or rod section, has an internal, rigid, element 6 of lattice form made up of rectangular meshes whereof the threads constituting the larger sides 7 of the rectangle are parallel to the longitudinal axis of the rod, and the others 8 perpendicular thereto. The lattice can be more tightly stretched than the lattice of FIG. 2 and lends itself very conveniently to internal guiding of a rod section for connection thereto. In order to be made detachable, the element need not be fixed to the smaller end of each section.

Referring to FIG. 4, the fishing rod or rod section has a detachable continuous internal cylindrical element for each rod section, which is made by blow-moulding of a parison of the same water-repellent plastic materials as in the foregoing examples in a suitable two-piece mould, the element having an internal surface of lattice form provided by internal annular rib portions 9 intended to form the fishing-line-guide rings and guide lengths for the incoming rod, and rounded hollow grooves 10 extending longitudinally of the rod section and constituting the water-removal channels; the grooves between different pairs of portions 9 being circumferentially offset. The element is semi-rigid but flexible; it may be thin, and if desired may be made up of successive lengths which are shorter than the rod section and simply placed end-to-end or welded. The annular portions 9 lend themselves well to the deformation which is necessary in order to guide together two rod sections. The wall of the element may if desired be perforated in order to allow water to pass therethrough.

The element may be formed simply by extrusion, and the grooves 10 may be disposed in a spiral while the pipe prepared by extrusion may or may not undergo suitable torsion upon emerging from the extruding machine.

The internal element may be in the form of a ringed pipe comprising apertures.

If the element is to be non-detachable the rod section, held vertically with the larger end upwards, may itself be used as the blow-mould, the parison then being inflated onto a cylindrical cotton net, comprising long rectangular meshes, tightly stretched axially in the rod section before blow-moulding takes place. In this type of continuous covering, the water being drained passes inside the short annular corrugations, but this disadvantage is amply compensated for by the fact that the annular corrugations have a greater spacing. Alternatively, the element may be simply corrugated in the longitudinal direction, and is again produced inside each rod section by using the rod as the blow-mould. The parison is produced by an extruding machine provided with a heated storage space and including a piston for rapidly ejecting the parison vertically downwards into the rod, the parison being extruded through a castellated extruder head 11, FIG. 5. The alternately thin and thick parts of this castellated parison do not become inflated by the same amount and thicker corrugations bear against the walls of the rod, the distance between the thinner corrugations and the centre of the parison depending on the width of the thicker parts of the parison. When a rod section thus equipped with such an element is bent, the corrugations approach one another until they touch, thus preventing the fishing line from entering the longitudinal channels in the element and becoming wet.

Referring to FIGS. 6 and 7, a non-detachable internal element is cut out of a sheet of 20/100 mm. polypropylene in, for example, a plane shape developing a conical frustum and exhibiting the same conical convergence as the interior surface of the rod section. The element so cut out has traced therein with a heated rounded-end tool, grooves 13 which are regularly spaced along generatrices of the conical frustum. The element can easily be folded into corrugations in the places thus grooved, and the corrugations which form water removal channels may be caused to alternate regularly in such a manner that the element may be introduced into the rod section 3 without its opposed longitudinal edges being welded to one another provided that the said edges meet at 14 at the bottom of a corrugation. Depending on the initial thickness of the element, the width of the grooves 13, the thickness remaining in the sheet of polypropylene at the grooves 13, and the ratio of the developed circumference of the element with respect to that of the inside of the rod section, varied shapes of corrugations 15 may be obtained, being wider on the wall of the rod for removing water, and narrower and more closely spaced toward the centre of the element, these latter corrugations form an excellent guide for the fishing line while preventing it from entering the water-removal channels when the rod bends under the action of any force.

Referring to FIGS. 8 and 9, the rod sections 16, 17, 18 can be telescoped and include a water-repellent element 20 of lattice form.

The internal element is applicable in one or other of its above described forms to fishing rod sections of relatively large diameters (40 mm. for example) or of very small diameters (3 to 5 mm. for example). Where it is required that the fishing rod has a solid tip or hollow tip of very small diameter, the smaller end being usually less than 2 mm. in diameter, then it is no longer possible to run the fishing line entirely inside the rod as far as the tip thereof. In this case, adapting the tip to the last (internal-line) section of fishing rod and running the line along this tip involve problems which have been solved in the following manner.

As shown in FIG. 10, the tip 19 is preferably fixed to the outside of the last section 18 of the fishing rod. The connection between the tip 19 and the length 18 may be made by various methods; for example the two pieces may be gripped in a rigid plastic net 25 having a gripping action. In order to prevent one piece from undergoing any displacement with respect to the other, these pieces are provided with flats, longitudinal grooves or suitable sharp edges. The line emerging from the length 18 is led along the tip 19 by means of line-carrier pieces 22 whereof the shape allows the line to be guided without any possibility of becoming hooked, and imparts optimum sliding conditions to it. Such very light pieces are depicted in FIGS. 11 and 12. They are placed in position on the tip by virtue of their own elasticity and longitudinal slit, and they grip the tip, while their lack of roughness and the fact that their surfaces are rounded on all sides prevent the line from becoming hooked.

The tip 19 may also support an extension of the internal element with which the last length 18 of the fishing rod is provided; which extension may extend 50% of the length of the tip. In this case, the line is automatically guided as far as the end of the tip in a sort of virtually uninterrupted tunnel of water-repellent material. This extension is fixed to the tip by any appropriate means such as a bayonet fixing.

In order to prevent any contact between the tip 19 and the line, the former may also be sheathed by means of one of the above described elements or a thread having a water-repellent surface may be wound in the form of a spiral round the tip. In this case, the element is outside the tip and plays a part identical with that which it plays when it is situated inside the rod sections, since it prevents the wet line from sticking to the surface of the tip.

The tip 19 may also be provided at its end 21 with at least one drying ring whereof the function is to remove some of the water carried along by the line when it is being rewound.

This drying ring is made wholly or partly of a water-repellent material or of mechanically strong materials whereof the surface has been made water-repellent by sheathing or coating or by any other known means.

If the tip section of the rod is of a sufficient diameter, it may receive an internal, water-repellent element, which element needs to be especially flexible and elastic in order to lend itself to the sometimes considerable bending which it undergoes when fishing is in progress. The element is advantageously constructed in the following manner:

A single 20/100 mm. nylon thread is covered by extrusion with 15 to 20/100 mm. of polyethylene, preferably expanded to about 0.5 diameter, which brings the overall external diameter to about 5 to 6 mm.

A conical mandrel such as a finely pointed tip made of solid compressed glass-polyester fibre is wound in the opposite direction with two lengths of this thread in such a manner that the crossings occur alternately on one side and then on the other on two diametrically opposite generatrices. These two windings are fixed at both ends of the mandrel in known manner, for example by an adhesive tape, and then the tip is heated for a minimum time to a temperature equal to or greater than melting point by any known means (for example by infra-red lamps) so that these threads become welded together at their crossings, and acquire a smooth and glossy surface. The lattice thus formed is then cooled in its mould and extracted from the mould under water. Such a covering made for example of low-density polyethylene expanded for example to 0.5 volume mass is very flexible; it lengthens and shortens elastically by about 100%, which enables it easily to follow all deformations which the tip undergoes in the course of fishing, and in particular when a large catch is hooked. This element is easily placed in position in a hollow tip, above all when the operation is carried out in water, which assists sliding by lubrication. It is also easily fixed at both ends of the tip by the nylon threads constituting the core of the two wound threads which may be bared and bound for example on the outside of both ends.

In the various foregoing examples, it has been assumed that the internal element for the rods was prepared, independently or in situ, after the body of the rod itself had been made. This is how an internal element is inserted or moulded in appropriate fashion into or in one or more existing rod sections. But it is also possible to construct the body of the rod or rod section round its internal element. For this purpose, suitably castellated longitudinal members or rings are cemented or welded or fixed to any "lattice" element as hereinbefore defined with the object of leaving sufficient space between the element and the internal wall of the rod section to allow the water to flow easily. In this particular method of preparing the rod, the latticed element may take the form of a tape of plastic material provided longitudinally with ribs or corrugations and apertures (slits or holes); such a tape may be wound round a suitable mandrel so as to form a continuous tube capable of constituting the internal element. The rod section or the whole rod according to circumstances may be constructed on the framework thus obtained after any protection which may be required has been applied to the latticed element by means of a film of plastic material for example in order to prevent the apertures of the lattice from becoming blocked in certain cases. Thus for example the film of plastic material surrounding the frame work of the element may be coated with a glass-polyester compound exhibiting after polymerisation mechanical properties capable of withstanding the forces of all kinds to which the body of the rod is subjected.

The present invention applies to all types of internal-line fishing rods, and for a given rod the internal elements may be identical or different for different rod sections.

What I claim is:

1. A fishing rod or fishing rod section which is hollow and which has internally an element of substantially cylindrical lattice form and comprised of a water-repellent material for guiding a fishing line through the interior thereof, said cylindical element extending from the inner end to the outer end of the rod or rod section and being spaced for substantially its entire length from the inner wall of the rod or rod section to provide a passage for water collected from the line and means at the inner end of the rod or rod section disposed between the adjacent end of the cylindrical element and the inner wall of the tube spacing the cylindrical element from the inner wall of the rod or rod section and forming a drain passage for the collected water.

2. A rod or rod section according to claim 1, wherein said element is in the form of a cage comprising a plurality of rings of hydrophilic material spaced longitudinal of the rod or rod section and joined together by a plurality of threads of hydrophilic material extending longitudinally of the rod or rod section and secured to said rings.

3. A rod or rod section according to claim 1 wherein said element is formed from threads of hydrophilic material arranged to define diamond-shaped openings in the element.

4. A rod or rod section according to claim 1, wherein the element is of hollow cylindrical shape having an internal surface of lattice form provided by annular ribs and grooves extending longitudinally of the rod or rod section.

5. A rod or rod section according to claim 1 in which said means is a castellated ring.

6. A fishing rod or rod section according to claim 1 wherein the element is composed of plastic.

7. A fishing rod according to claim 1 comprising a plurality of rod sections connectable together, the elements of the sections being aligned when the sections are connected.

8. A fishing rod or rod section according to claim 1 in which the outer end of the internal cylindrical element is in engagement with the outer end of the rod or rod section, and said rod or rod section is larger in diameter at the inner end than at the outer end thereof.

9. A fishing rod comprising a hollow section which has internally an element of substantially cylindrical lattice form and comprised of a water-repellent material for guiding a fishing line through the interior thereof, the cylindrical element extending from the inner end to the outer end of the hollow rod section and being spaced for substantially its entire length from the inner wall of the rod section to provide a passage of water collected from the line, and means at the inner end of the rod section disposed between the cylindrical element and the inner wall of the rod section spacing the cylindrical element from the inner wall of the rod section and forming a drain passage for collected water, and a solid tip section having line engaging fittings thereon extending outwardly from the outer end of the hollow section, the inner end portion of the solid tip section being fixedly secured to the outer surface of the outer end portion of the hollow section.

10. A fishing rod according to claim 9 in which the cylindrical element of said hollow rod section extends outwardly from the outer end thereof and along at least 50% of the length of the tip section, and means for securing the element to said tip section.

11. A fishing rod according to claim 9 wherein the line-engaging fittings are all formed from a water-repellent material.

References Cited

UNITED STATES PATENTS

| 1,994,069 | 3/1935 | Fletcher | 273—80 |
| 2,578,663 | 12/1951 | Beaupre | 43—18 X |
| 2,777,239 | 1/1957 | Cushman | 43—18 |
| 3,216,144 | 11/1965 | Vojinov | 43—18 |

WARNER H. CAMP, Primary Examiner

U.S. Cl. X.R.

43—24